United States Patent [19]

Olson et al.

[11] Patent Number: 4,992,288
[45] Date of Patent: Feb. 12, 1991

[54] METHOD OF REMOVING SULFITE FROM SUGARBEETS

[75] Inventors: Roland F. Olson, Fargo, N. Dak.; Richard R. Fergle, Moorhead, Minn.

[73] Assignee: American Crystal Sugar Company, Moorhead, Minn.

[21] Appl. No.: 373,034

[22] Filed: Jun. 29, 1989

Related U.S. Application Data

[63] Continuation of Ser. No. 57,987, Jun. 4, 1987, abandoned.

[51] Int. Cl.$^5$ .............................................. A23L 1/214
[52] U.S. Cl. .................................. 426/429; 426/640; 426/259
[58] Field of Search ............... 426/258, 259, 640, 431, 426/253, 256, 257, 429, 658, 615; 162/91, 99, 10, 160, 150; 127/43, 44

[56] References Cited

U.S. PATENT DOCUMENTS

| | | | |
|---|---|---|---|
| 183,389 | 10/1857 | Collyer . | |
| 2,367,771 | 1/1945 | Hampel | 8/105 |
| 2,430,674 | 11/1947 | Hampel | 127/46 |
| 3,251,731 | 5/1966 | Gard | 162/71 |
| 3,484,254 | 12/1969 | Peterson | 99/105 |
| 3,574,634 | 4/1971 | Singer | 99/83 |
| 3,676,150 | 7/1972 | Glicksman | 99/90 |
| 3,928,121 | 12/1975 | Zepeda-Castillo | 162/14 |
| 4,076,552 | 2/1978 | Farag | 127/50 |
| 4,241,093 | 12/1980 | Farag | 426/258 |
| 4,273,590 | 6/1981 | Cionewitz | 127/44 |
| 4,307,121 | 12/1981 | Thompson | 127/37 |
| 4,314,854 | 2/1982 | Takagi | 127/37 |
| 4,432,806 | 2/1984 | Madsen | 210/638 |
| 4,451,489 | 5/1984 | Beale | 426/254 |
| 4,629,575 | 12/1986 | Weibel | 162/99 |
| 4,795,653 | 1/1989 | Bommarito | 426/615 |
| 4,882,190 | 11/1989 | Olson | 426/615 |

FOREIGN PATENT DOCUMENTS

| | | |
|---|---|---|
| 105482 | 4/1984 | European Pat. Off. . |
| 2733 | of 1855 | United Kingdom . |
| 27 | of 1863 | United Kingdom . |
| 1555647 | 11/1979 | United Kingdom . |

OTHER PUBLICATIONS

The Merck Index, 1976, Merck & Co., Inc., Rahway, N.J., p. 4695.
Kirk-Othmer Encyclopedia of Chemical Technology, Third Edition, vol. 17, Peroxide, pp. 1-26.
Lee, 1975, Basic Food Chemistry, AVI Publishing Co. Inc., Westport, Conn., pp. 215-216.
J. Grant, "Hackh's Chemical Dictionary", 1969, McGraw-Hill Book Co., p. 102.
*Food Engineering,* Oct. 1986, "Acidulants Find Growth Niches in Mature Market," pp. 83-88.
A. E. Przybyla, *Food Engineering,* Jun. 1986, "Sulfite Labeling . . . ," pp. 80-82.
C. S. Ough, *C&EN Special Report,* Jan. 5, 1987, published by the American Chemical Society, "Chemicals Used in Making Wine," pp. 19-28.
F. Maxwell, *London: Norman Rodger,* 1916, "Sulphitation in White Sugar Manufacture".
*Kirk-Othmer Encyclopedia of Chemical Technology,* Third Edition, vol. 22, Sulfur Compounds, pp. 147 and 164-166.
*Kirk-Othmer Encyclopedia of Chemical Technology,* Third Edition, vol. 19, Pulp, pp. 413-415.
G. V. Genie, *Sugar Technology Reviews,* Elseview Publishing Co., ISSN 0081-9204, vol. 9, No. 2, Jul. 1982, pp. 217, 228, 263, 264.
K. Wagnerowski, C. Dabrowski, S. Murawski, R. Oder, *Gazeta Cukrownicza,* vol. 83, No. 4, 1975, "Water Sulphitation by Ejector and Gas from Rotary Stove," pp. 86-90, and 113-116.
K. Wagnerowski, *Gazeta Cukrownicza,* vol. 82, No. 9, 1974, "Improvement of Process of Sugar from Cossettes Extraction Acidifying Extracting Water," pp. 234-239, and 255-260.

*Primary Examiner*—Carolyn Paden
*Attorney, Agent, or Firm*—Merchant, Gould, Smith, Edell, Welter & Schmidt

[57] ABSTRACT

A method for reducing the amount of sulfites in a sugarbeet comprising the steps of slicing the sugarbeet into cossettes and contacting the cossettes with an oxidizing compound such as hydrogen peroxide.

25 Claims, No Drawings

METHOD OF REMOVING SULFITE FROM SUGARBEETS

This application is a continuation of application Ser. No. 07/057,987, filed June 4, 1987, now abandoned.

FIELD OF THE INVENTION

The invention relates generally to methods of decreasing the sulfite content of sugarbeets to form a high fiber food supplement fit for human consumption.

BACKGROUND OF THE INVENTION

Sulfites are antioxidants having the useful ability to prevent the premature browning of vegetables treated therewith. Sulfites have long been used at various stages in the processing of sugarbeets including: (i) in the diffuser water to enhance the rate of diffusion; (ii) in the sugar-rich juice to control juice color after purification and reduce the pH profile during evaporation; and (iii) in diffusion water and return press pulp water to inhibit microbiological growth and reduce the pH for improved pulp pressing.

Recent concerns over the possibility of adverse side effects created by the ingestion of sulfites has led to a dramatic decline in the use of sulfites on foods intended for human consumption. In the past the utilization of sulfites in the processing of sugarbeets has not posed a problem as a portion of the sulfite employed during sugarbeet processing is absorbed by the sugarbeet pulp, which is sold as livestock feed, while the extracted sugar, which is intended for human consumption, is substantially sulfite-free.

Recent advances in the processing of sugarbeet pulp has resulted in sugarbeet pulp suitable for use as a high fiber human dietary supplement. However, the level of sulfite typically present in the pulp creates a drawback to its widespread use as a human foodstuff.

Accordingly, a need exists for a method of producing substantially sulfite-free sugarbeet pulp that maintains the beneficial effects of employing a sulfite during sugarbeet processing.

SUMMARY OF THE INVENTION

Our novel method reduces the amount of sulfites typically present in processed sugarbeet pulp by contacting the processed sugarbeet pulp with an effective sulfite eliminating amount of an oxidizing compound.

As utilized herein, "sugarbeet cossettes" refers to sugar-containing sugarbeet pieces created by slicing a sugarbeet into a plurality of pieces.

As utilized herein, "sugarbeet pulp" refers to the fiber material remaining after the extraction of most of the sugar from a sugarbeet.

DETAILED DESCRIPTION OF THE INVENTION INCLUDING A BEST MODE

We have discovered that treating sugarbeet cossettes or sugarbeet pulp with an oxidizing compound can result in a substantial reduction in the sulfite content of the cossette or pulp.

The sugarbeet is a form of the common beet "*Beta vulgaris*" which is commercially grown in large quantities for its sugar content. While dependent upon the particular species and growing conditions, whole, mature sugarbeets typically consist of about 75–80 wt-% water, 14–20 wt-% sugar, pectin material, and minor amounts of other components such as amino acids, minerals, etc. The portion of the sugarbeet remaining after commercial extraction of the sugar is known as sugarbeet pulp and is generally sold as livestock feed.

To aid in the processing of sugarbeet cossettes and minimize discoloration of the resultant sugarbeet pulp, sugarbeet processing plants typically incorporate a source of sulfite in the water used to extract sugar from the sugarbeets, at a concentration of about 250 to 3,000 ppm sulfite, based upon the cossettes. The sources of sulfite used in the process are typically gaseous or liquid sulfur dioxide obtained commercially or from the combustion of sulfur or sulfite salts. Use of a sulfite source during the extraction of sugar from sugarbeet cossettes results in sulfite-containing sugarbeet pulp.

We have discovered that the benefits derived from the use of sulfite during the extraction of sugar from sugarbeet cossettes may be retained while the sulfite concentration in the sugarbeet pulp reduced significantly (typically to less than 50 ppm and often to less than 10 ppm, resulting in a reduction of sulfite content by at least about 50% and often by at least about 75%) by contacting the sulfite-containing sugarbeet pulp with a stoichiometric excess, based upon the amount of sulfite in the sugarbeet pulp or added to the extraction water, of an oxidizing compound. Alternatively stated, the sulfite concentration may be reduced by at least about 50% and often by at least about 75% by treating the sulfite-containing sugarbeet pulp with about 200 to 4500 ppm of an oxidizing compound, based upon the pulp, or in general, in an amount such that the weight ratio of sulfite in the sugarbeet pulp to the oxidizing compound is within the range of about 1:1 to 1:2.5. The sulfite content may also be reduced by at least about 50% and often by at least about 75% by treating the sulfite-containing sugarbeet pulp with an oxidizing compound in an amount such that the weight ratio of sulfite in the extraction water to the oxidizing compound is within the range of about 1:1 to 1:2.5.

The type, amount and concentration of oxidizing compound; contact time; contact conditions; etc. discussed with respect to the reduction of sulfites in sugarbeets is discussed below. The concentration of sulfites in the sugarbeet cossettes or sugarbeet pulp can be conveniently measured by AOAC 20.123 as set forth at page 391 of *Association of Analytical Chemists*, 14th Ed., 1984.

Oxidizing agents thought to be useful in the method of the present invention include the organic and inorganic peroxides, ozone, chlorine dioxide, and aqueous solutions thereof. Because of its low cost and ease of availability, the preferred oxidizing compound for use in our method is hydrogen peroxide.

Hydrogen peroxide is typically available in aqueous solutions of varying concentrations. A detailed discussion of hydrogen peroxide's chemical structure, chemical and physical properties and method of manufacture can be found in Kirk-Othmer, *Encyclopedia of Chemical Technology*, 2nd Ed., Vol. 11, pp. 391–417, which is hereby incorporated by reference.

Commercially available aqueous hydrogen peroxide solutions are offered in a variety of concentrations ranging from about 3 to 90 wt-% hydrogen peroxide. Our process preferably contacts the sugarbeet with a solution of, rather than pure, hydrogen peroxide in order to enhance contact between the sugarbeet and the hydrogen peroxide, while using a small ratio of hydrogen peroxide to sugarbeet. It is further preferred to use a solution of hydrogen peroxide, as solutions of hydrogen peroxide are less expensive and easier to work with than pure hydrogen peroxide.

In order to achieve a cost effective reduction at a sufficiently rapid rate it is preferred to contact the sugarbeet cossette or sugarbeet pulp with a 0.1 to 10 wt-%, preferably 0.2–2 wt-%, hydrogen peroxide solution (or aqueous solutions of other oxidizing compounds included in the invention) at a ratio of about 1 part by weight pure hydrogen peroxide to 50 to 500 parts by weight sugarbeet, preferably 1 part by weight pure hydrogen peroxide to 100 to 500 parts by weight sugarbeet.

While the contact time necessary to ensure maximum reduction varies with reaction conditions such as concentration of hydrogen peroxide, size of cossettes or pulp particles, temperature, agitation rate, etc., we have discovered that about 2–10 minutes contact time at a contact temperature of about 20°–95° C., preferably 30°–60° C., is typically sufficient.

EXAMPLE I

Standard 600 lbs. of extracted sugarbeet pulp containing 30 ppm sulfite was placed in an attrition scrubber purchased from the Denver Equipment Division of Joy Manufacturing and contacted with 50° C. water for 10 minutes at a flow rate of 250 lbs. of water per hour. The pulp was then placed on a screen and rinsed with 50° C. water for 1 minute at a rate of 500 lbs. of water per hour. Finally, the pulp was pressed and dried to a water content of about 6%. The dried pulp contained 24 ppm sulfite as measured by AOAC 20.123.

EXAMPLE II

0.6 Wt-% Hydrogen Peroxide 600 lbs. of extracted sugarbeet pulp containing 30 ppm sulfite was placed in an attrition scrubber purchased from the Denver Equipment Division of Joy Manufacturing and contacted with 50° C. 0.6 wt-% hydrogen peroxide solution for 5–10 minutes at a flow rate of 250 lbs. of hydrogen peroxide solution per hour. The pulp was then placed on a screen and contacted with 50° C. water for 1 minute at a rate of 500 lbs. of water per hour. Finally, the pulp was pressed and dried to a water content of about 6%. The dried pulp contained 9 ppm sulfite as measured by AOAC 20.123.

EXAMPLE III

0.2 wt-% Hydrogen Peroxide 600 lbs. of extracted sugarbeet pulp containing 24 ppm sulfite was placed in an attrition scrubber purchased from the Denver Equipment Division of Joy Manufacturing and contacted with a 50° C. 0.2 wt-% hydrogen peroxide solution for 5–10 minutes at a flow rate of 250 lbs. of hydrogen peroxide solution per hour. The pulp was then placed on a screen and rinsed with 50° C. water for 1 minute at a rate of 500 lbs. of water per hour. Finally, the pulp was pressed and dried to a water content of about 6%. The dried pulp contained 6 ppm sulfite as measured by AOAC 20.123.

The specification and Examples above are presented to aid in the complete nonlimiting understanding of the invention. Since many variations and embodiments of the invention can be made without departing from the spirit and scope of the invention, the invention resides in the claims hereinafter appended.

We claim:

1. A method of reducing sulfites from sulfite-containing sugarbeet pulp so as to render the pulp fit for human consumption; said method comprising the steps of obtaining sulfite-containing sugarbeet pulp and treating the sulfite-containing sugarbeet pulp with an effective sulfite eliminating amount of an oxidizing compound, which is selected from the group consisting of an organic peroxide, an inorganic peroxide, ozone, and chlorine dioxide, for a time sufficiently long so as to reduce the sulfite content of the pulp by at least about 50%.

2. The method of claim 1 wherein the step of treating the sulfite-containing sugarbeet pulp with the oxidizing compound is conducted for a time sufficiently long so as to reduce the sulfite content of the pulp by at least about 75%.

3. The method of claim 1 wherein the oxidizing compound is an inorganic peroxide.

4. The method of claim 3 wherein the inorganic peroxide is hydrogen peroxide.

5. The method of claim 4 wherein the pulp is treated with the hydrogen peroxide at a temperature of about 30° C. to 60° C.

6. The method of claim 3 wherein the pulp is treated with the inorganic peroxide so that the weight sulfite in the sugarbeet pulp, prior to reduction, to inorganic peroxide is within a range of about 1:1 to 1:2.5.

7. The method of claim 6 wherein the pulp comprises cossettes treated with sulfite during the extraction of sugar therefrom.

8. The method of claim 4 wherein the sugarbeet pulp is treated with the hydrogen peroxide as a 0.1 to 10.0 wt-% aqueous solution of said hydrogen peroxide.

9. The method of claim 3 wherein the pulp comprises cossettes treated with sulfite during the extraction of sugar therefrom.

10. The method of claim 1 wherein the pulp is treated with an excess stoichiometric amount of the oxidizing compound, based upon the weight of sulfite.

11. The method of claim 1 wherein the pulp is treated with the oxidizing compound so that the weight ratio of sulfite in the sugarbeet pulp, prior to reduction, to oxidizing compound is within a range of about 1:1 to 1:2.5.

12. The method of claim 1 wherein the sugarbeet pulp is treated with the oxidizing compound as a 0.1 to 10.0 wt-% aqueous solution of said oxidizing compound.

13. The method of claim 12 wherein the pulp comprises cossettes treated with sulfite during the extraction of sugar therefrom.

14. The method of claim 1 wherein the pulp is treated with the oxidizing compound at a temperature of about 30° C. to 60° C.

15. The method of claim 1 wherein the pulp comprises cossettes treated with sulfite during the extraction of sugar therefrom.

16. The method of claim 1 additionally comprising the step of rinsing the sugarbeet pulp with water so as to remove remaining oxidizing compound.

17. A method of making substantially sulfite-free dietary fiber from sugarbeet pulp so as to render the pulp fit for human consumption; said method comprising the steps of:
   (a) obtaining sugarbeets;
   (b) slicing said sugarbeets into a plurality of cossettes;
   (c) treating said cossettes with water containing about 250 to 3,000 ppm sulfite so as to extract sugar from the cossettes and thereby create sugarbeet pulp; and
   (d) treating said sugarbeet pulp with an oxidizing compound, so that the weight ratio of sulfite contained in the water used in step (c) to the oxidizing compound is within the range of about 1:1 to 1:2.5; said oxidizing compound being selected from the group consisting of an organic peroxide, an inorganic peroxide, ozone, and chlorine dioxide.

18. The method of claim 17 wherein the oxidizing compound is an inorganic peroxide.

19. The method of claim 18 wherein the inorganic peroxide is hydrogen peroxide.

20. The method of claim 19 wherein the sugarbeet pulp is treated with the hydrogen peroxide at a temperature of about 30° C. to 60° C.

21. The method of claim 19 wherein the sugarbeet pulp is treated with the hydrogen peroxide as a 0.1 to 10.0 wt-% aqueous solution of said hydrogen peroxide.

22. The method of claim 17 wherein the sugarbeet cossettes are treated with about 250 to 3,000 ppm sulfite, based upon the cossettes, and the sugarbeet pulp is treated with about 200 to 4,500 ppm oxidizing compound, based upon the pulp.

23. The method of claim 17 wherein the sugarbeet pulp is treated with the oxidizing compound as a 0.1 to 10.0 wt-% aqueous solution of said oxidizing compound.

24. The method of claim 17 wherein the sugarbeet pulp is treated with the oxidizing compound at a temperature of about 30° C. to 60° C.

25. The method of claim 17 additionally comprising the step of rinsing the sugarbeet pulp with water so as to remove remaining oxidizing compound.

* * * * *